United States Patent [19]
Yokota et al.

[11] Patent Number: 5,907,644
[45] Date of Patent: May 25, 1999

[54] IMAGE ACQUIRING DEVICE FOR COMPONENT MOUNTING APPARATUS

[75] Inventors: Shuichi Yokota, Kyoto; Eiichi Hachiya, Katano; Hidekuni Shinyama, Kawaguchi, all of Japan

[73] Assignee: Matsushita Electric Industrial Co., Ltd., Osaka-fu, Japan

[21] Appl. No.: 08/840,717

[22] Filed: Apr. 25, 1997

[30] Foreign Application Priority Data

Apr. 26, 1996 [JP] Japan .................. 8-108220

[51] Int. Cl.⁶ .................................................. G06K 9/20
[52] U.S. Cl. .................................................. 382/312
[58] Field of Search .......................... 250/566, 568;
235/454, 470, 471, 462, 464; 356/394,
386, 446, 387, 237, 398, 448; 348/125,
126, 131; 382/149, 151, 312, 321, 323

[56] References Cited

U.S. PATENT DOCUMENTS

| | | | |
|---|---|---|---|
| 4,614,430 | 9/1986 | Hara et al. ............................ | 382/149 |
| 4,700,078 | 10/1987 | Mizuno et al. ........................ | 382/321 |
| 4,877,326 | 10/1989 | Chadwick et al. .................... | 356/394 |
| 5,131,755 | 7/1992 | Chadwick et al. .................... | 356/394 |
| 5,298,989 | 3/1994 | Tsukahara et al. ................... | 348/126 |

*Primary Examiner*—Jose L. Couso
*Attorney, Agent, or Firm*—Wenderoth, Lind & Ponack, L.L.P.

[57] ABSTRACT

An image acquiring device for a component mounting apparatus includes a line sensor provided with photodetecting elements in one array or a plurality of arrays, and a CCD register for transmitting electric charges accumulated in the photodetecting elements to an output part. The device also includes an illumination unit having one or a plurality of light sources of a high directivity for feeding light to illuminate an electronic component. The one or plurality of light sources are arranged to condense the light to an image-acquiring line of the line sensor.

12 Claims, 4 Drawing Sheets

IMAGE ACQUIRING DEVICE FOR COMPONENT MOUNTING APPARATUS

BACKGROUND OF THE INVENTION

The present invention relates to a component recognition apparatus installed in industrial automated facilities, and more particularly to an image acquiring device of the component recognition apparatus.

The prior art will be discussed below with reference to FIG. 7. FIG. 7 is a block diagram showing the constitution of a conventional component recognition apparatus, in which reference numerals 11, 12 and 31–33 are a component holding nozzle, an electronic component to be recognized, a CCD camera, an illumination device and a lens barrel respectively. The operation of a conventional image acquiring device in the thus-constituted recognition apparatus will now be depicted. Referring to FIG. 7, the component 12 held by the component holding nozzle 11 is temporarily stopped on a vertical line of the CCD camera 31, where the component is recognized. At this time, the electronic component 12 is illuminated by the illumination device 32 with a sufficient amount of light for exposure. After an advancing direction of light is changed by the lens barrel 33, the light is taken into the CCD camera 31 and then, the component is moved to a next stage. The illumination device 32 used here is constituted of, e.g., a plurality of LEDs arranged on a board to uniformly illuminate the whole view field for the electronic component. For example, when the electronic component is 60 mm×60 mm, the illumination device 32 is so designed as to uniformly illuminate the 60 mm×60 mm view field. For this purpose, in the prior art a diffusing plate or a like arrangement is inserted to prevent an illumination irregularity.

In acquiring an image of the electronic component with the use of a line sensor as the camera, an acquiring line of the line sensor is overlapped with the electronic is component thereby to set a size of the view field. Therefore, if the electronic component is scanned at high speed, the resulting scarcity of illuminance may lead to a shortage of electric charges of photodetecting elements. If a light source is lowered in height to increase the illuminance of the acquiring line in the event that the light source shows a high directivity, the illuminance of the acquiring line is apt to be irregular.

SUMMARY OF THE INVENTION

An object of the present invention is to provide an inexpensive image acquiring device for a component mounting apparatus which is adapted to condense light of one or a plurality of light sources to an image-acquiring line of a line sensor, thereby eliminating a sensitivity deficiency resulting from insufficient charging of the line sensor, and thus enabling the acquisition of images at high speed.

In accomplishing these and other aspects, according to a first aspect of the present invention, there is provided an image acquiring device for a component mounting apparatus which includes a line sensor provide with photodetecting elements in one array or a plurality of arrays, and a CCD register for transmitting electric charges accumulated in the photodetecting elements to an output part. The image acquiring device also includes an illumination unit having one or a plurality of light sources of a high directivity for feeding light to illuminate an electronic component. The one or plurality of light sources are arranged to condense the light to an image-acquiring line of the line sensor.

According to a second aspect of the present invention, there is provided an image acquiring device for a component mounting apparatus according to the first aspect, wherein the illumination unit includes a horizontal illumination device for illuminating the electronic component at a predetermined angle to a center of the electronic component in a direction perpendicular to a running direction of the electronic component. The illumination unit also includes a vertical illumination device for illuminating the electronic component with keeping an angle to the center of the electronic component on a circumference of a predetermined radius.

According to a third aspect of the present invention, there is provided an image acquiring device for a component mounting apparatus according to the second aspect, wherein the horizontal illumination device is disposed at an illumination height determined by an illumination size in a longitudinal direction of the image-acquiring line of the line sensor and the illumination angle thereof.

According to a fourth aspect of the present invention, there is provided an image acquiring device for a component mounting apparatus according to the third aspect, wherein the vertical illumination device is disposed on the arrangement radius determined in conformity with the illumination height of the horizontal illumination device.

According to fifth and sixth aspects of the present invention, there is provided an image acquiring device for a component mounting apparatus according to the first and second aspects, wherein a luminance of light sources of the illumination unit is variable.

According to seventh and eighth aspects of the present invention, there is provided a image acquiring device for a component mounting apparatus according to the first and second aspects, wherein the illumination angle of the illumination unit is variable.

According to ninth and tenth aspects of the present invention, there is provided a image acquiring device for a component mounting apparatus according to the first and second aspects, wherein a wavelength of light sources of the illumination unit is variable.

In the first aspect, since each light source is arranged to condense light to the image-acquiring line of the line sensor, the deficiency of sensitivity because of insufficient charging of the line sensor can be eliminated, and accordingly the image acquiring device is inexpensive and can acquire images at high speed.

In the second aspect, the image acquiring device can concentrate light efficiently both in the longitudinal direction and in the lateral direction of the image-acquiring line of the line sensor.

In the third aspect, an illumination irregularity in the image-acquiring line can be prevented.

In the fourth aspect, the illumination irregularity in the image-acquiring line can be prevented without losing the condensing efficiency of light in the lateral direction of the image-acquiring line of the line sensor.

Since the luminance, angle and wavelength of each light source are rendered variable in the aspects of the present invention, it becomes possible to adopt the light source optimum to each of electronic components of different reflecting characteristics when the electronic components are acquired by the image acquiring device of the present invention.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
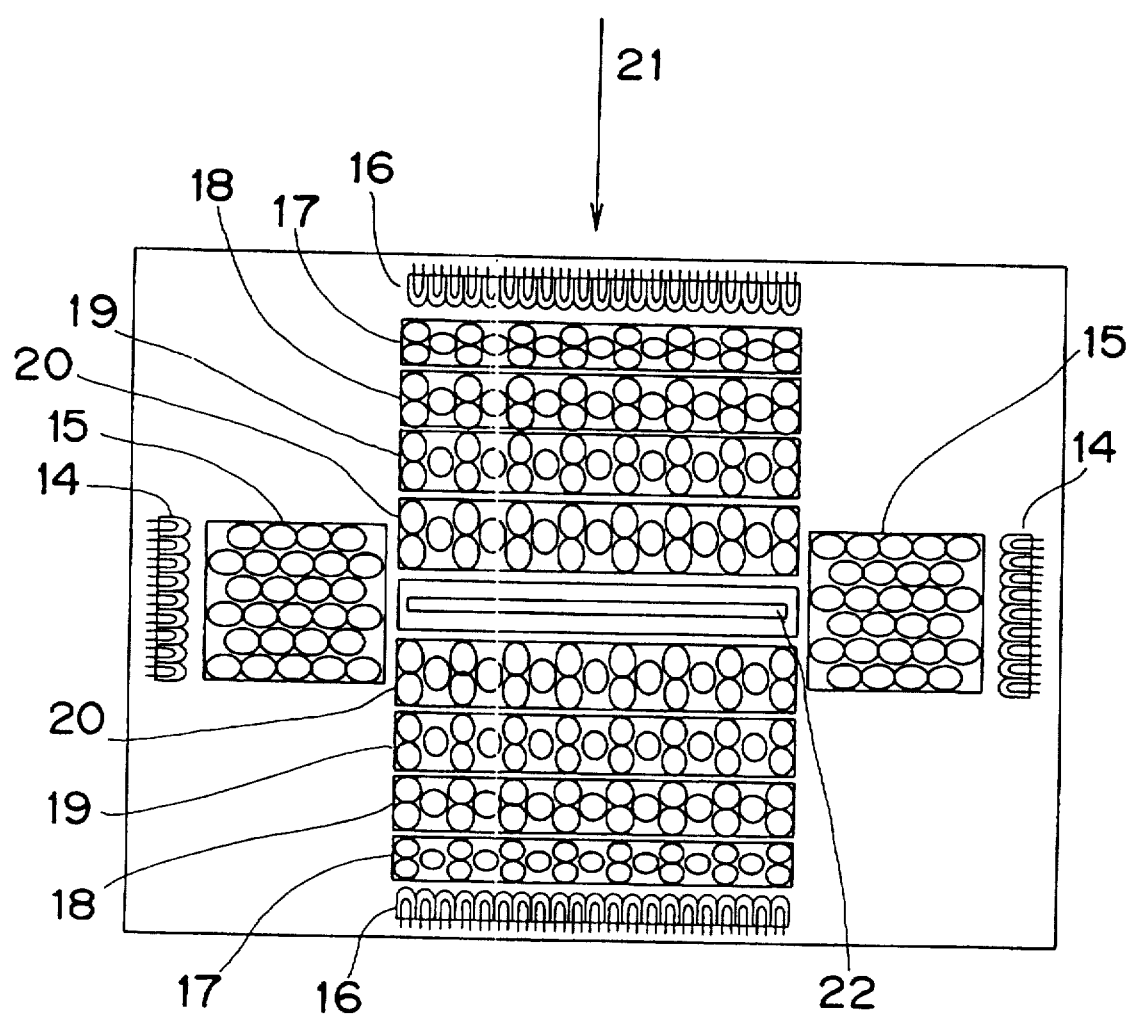
FIG. 1 is a front view of an image acquiring device for a component mounting apparatus in one embodiment of the present invention.

Before the description of the present invention proceeds, it is to be noted that like parts are designated by like reference numerals throughout the accompanying drawings.

A preferred embodiment of the present invention will be described with reference to the drawings. In the constitution described hereinbelow, parts in the same constitution as of the prior art are designated by the same reference numerals and the description thereof will be omitted.

Figure 2:
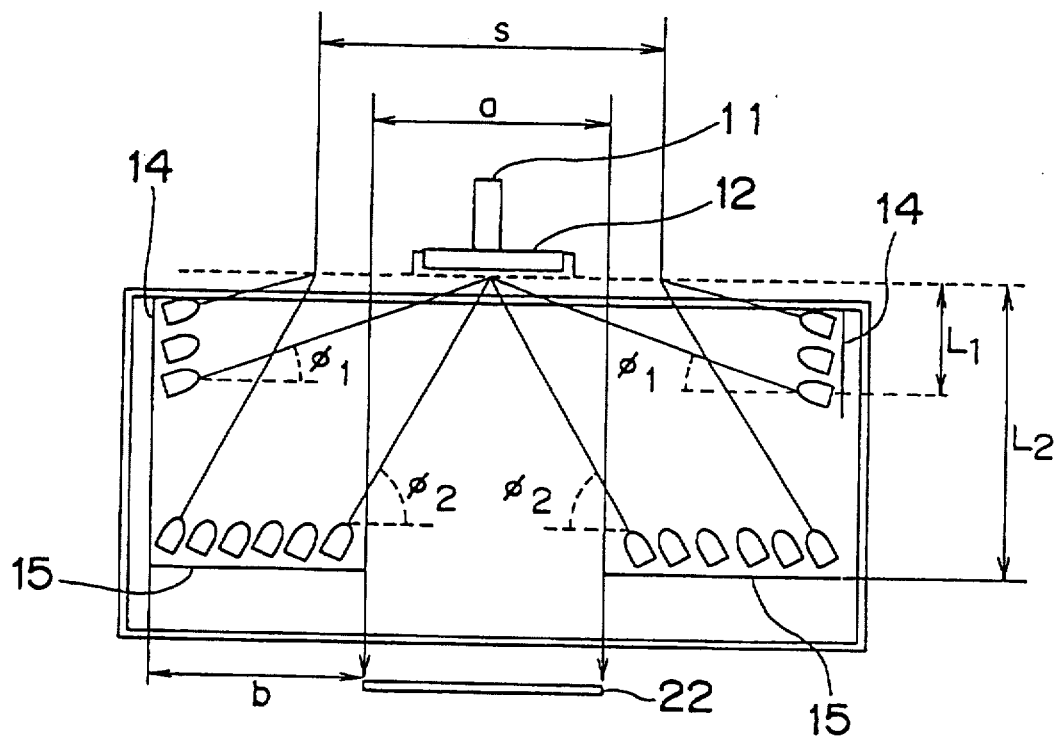
FIG. 2 is a longitudinal side view of an image-acquiring line of a line sensor of the image acquiring device of FIG. 1.
Figure 3:
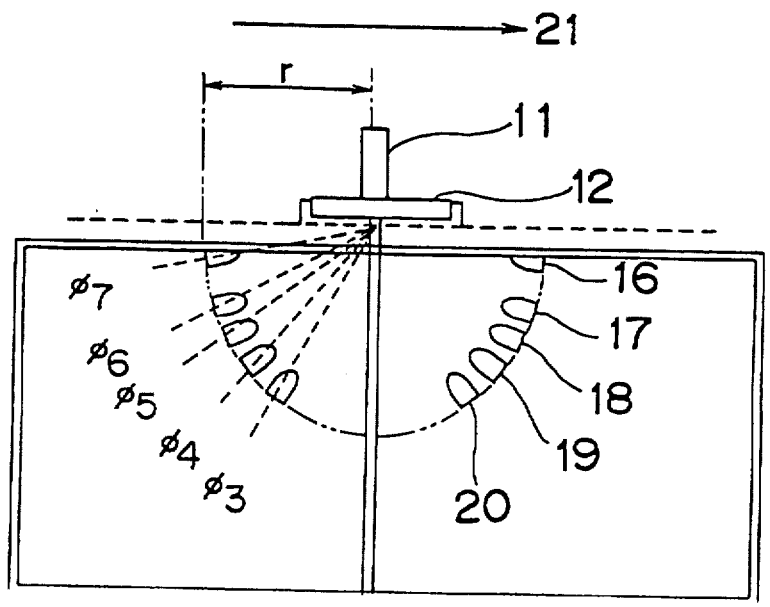
FIG. 3 is a lateral side view of the image-acquiring line of the line sensor of the image acquiring device of FIG. 1.
Figure 4:
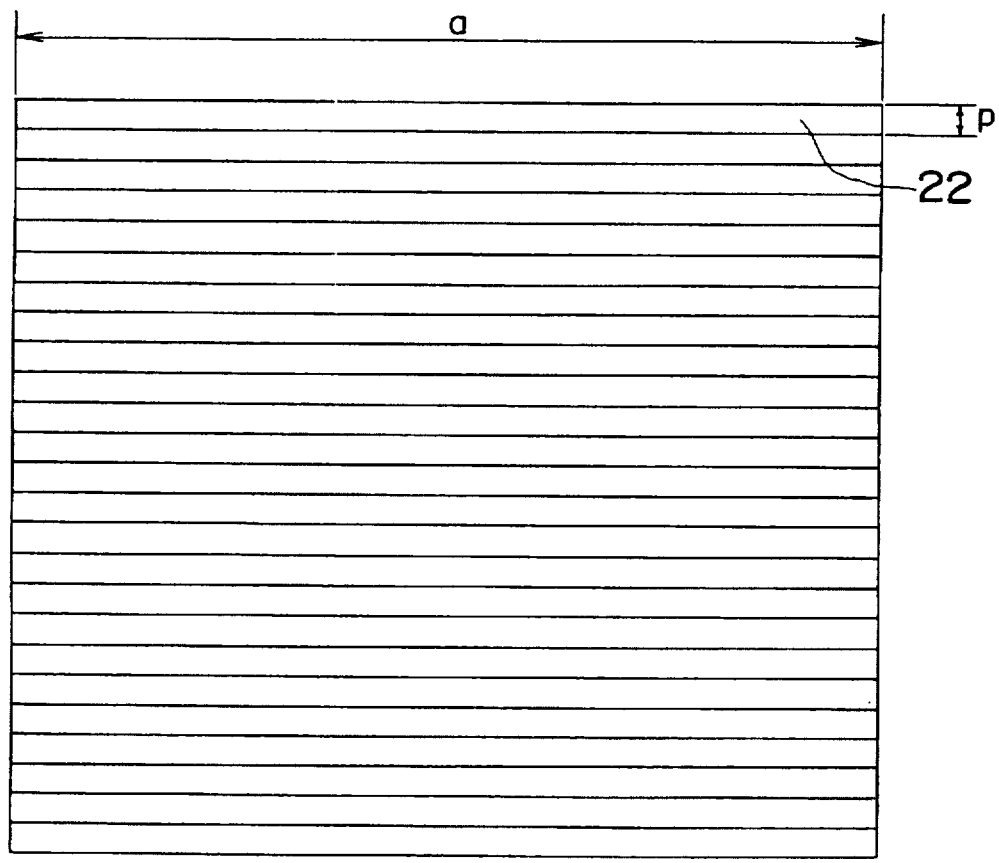
FIG. 4 is an explanatory diagram of a method for synthesizing image data obtained by the line sensor.
Figure 5:
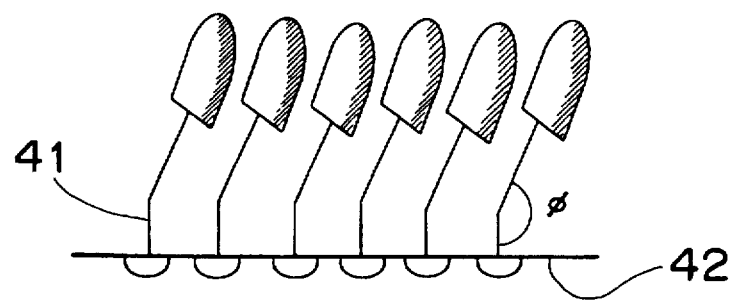
FIG. 5 is a schematic diagram of the image acquiring device in an example when an illumination angle is variable.
Figure 6:
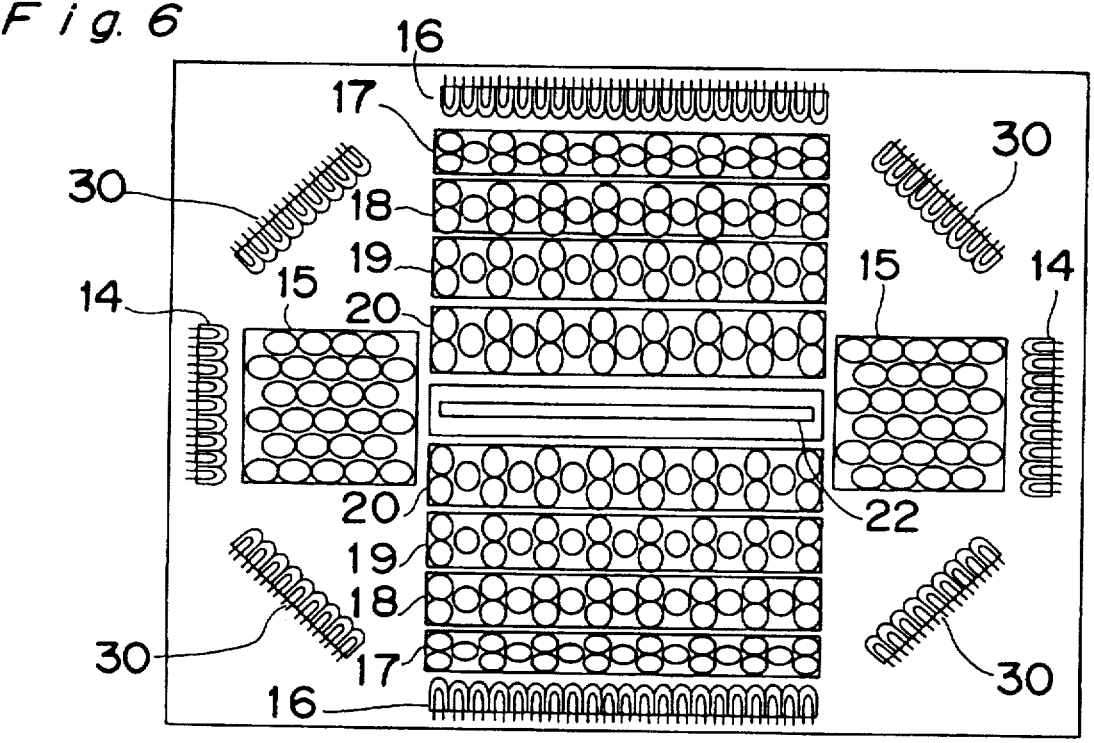
FIG. 6 is a front view of the image acquiring device in an example when an illumination luminance is made variable.
Figure 7:
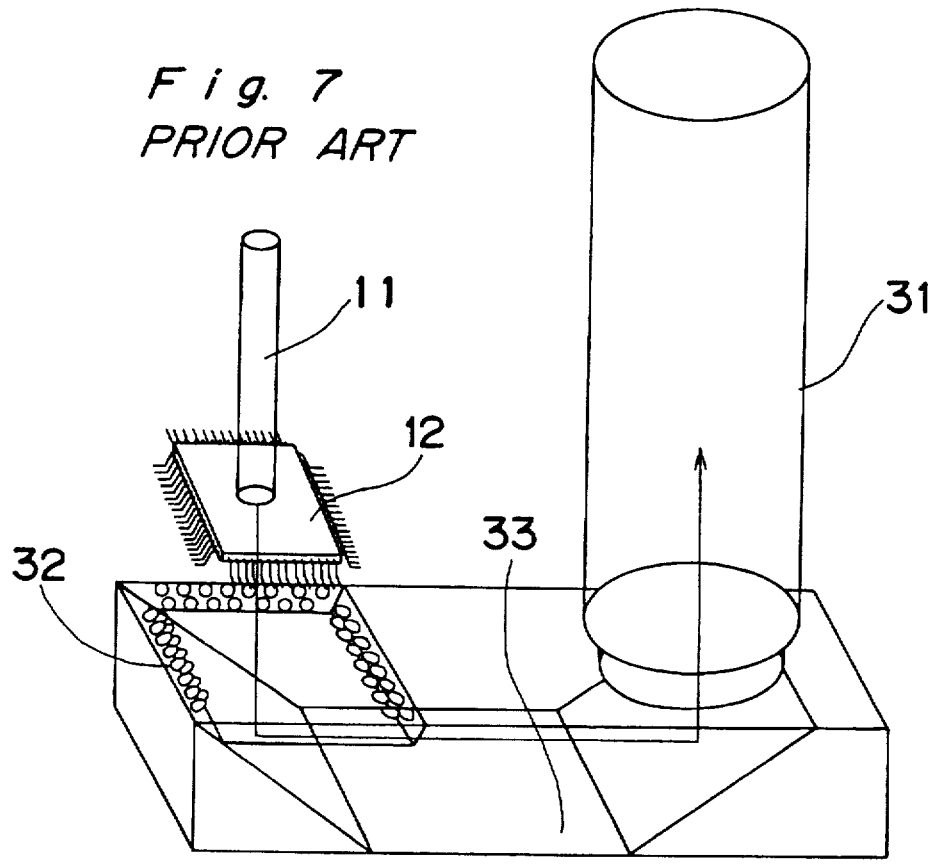
FIG. 7 is a schematic view of a conventional image acquiring device for a component mounting apparatus.

FIG. 1 is a front view showing the constitution of an image acquiring device for a component mounting apparatus according to an embodiment of the present invention. In the drawing, 14, 15 are illumination devices for illuminating an electronic component in a direction to a scanning direction 21 of the electronic component, 16–20 are illumination devices for illuminating the electronic component in a direction parallel to the scanning direction 21 as viewed from above and, 22 is an acquiring line of a line sensor. Each illumination device 14–20 is constituted of many LEDs of a high directivity arranged on a plane. FIG. 2 is a side view of the image acquiring device of FIG. 1 seen from a longitudinal direction of the image-acquiring line of the line sensor, in which an image of the electronic component 12 to be acquired is held by a component holding nozzle 11. On the other hand, FIG. 3 is a side view of the image acquiring device seen from a lateral direction of the image-acquiring line of the line sensor. FIG. 4 shows how to synthesize transmitted image data. FIG. 5 is a diagram explanatory of a method for varying an angle of a light source, wherein LEDs 41 are mounted on a board 42. FIG. 6 illustrates an example of the constitution when an angle of the light source is made variable by illumination devices 30.

In the constitution described above, each component of the image acquiring device operates as follows. Referring to FIG. 2, the electronic component 12 held by the component holding nozzle 11 is scanned in a direction parallel to the longitudinal direction of the acquiring line 22 of the line sensor, namely, in a direction within the sheet of the drawing. (n) image data obtained for every acquiring line 22 are overlapped thereby to form an image data of a size a×n×p wherein (a) is a length of the image-acquiring line in the longitudinal direction and (p) is a pitch of the image-acquiring lines, as exemplified in FIG. 4. The obtained image data is transmitted to, e.g., a recognition processing board. In general, (a) and (p) correspond to a size and a resolution of an image. When a view field is 60 mm×60 mm, approximately a=60 mm and p=40 μm are common. As shown in FIG. 2, the illumination devices 14, 15 for the direction to the scanning direction is mounted to illuminate the electronic component 12 with angles $\phi_1$, $\phi_2$ to the center of the electronic component 12. Similarly, the illumination devices 16, 17, 18, 19, 20 is mounted to illuminate the electronic component 12 with angles $\phi_3$, $\phi_4$, $\phi_5$, $\phi_6$, $\phi_7$ on a circumference of a radius (r) to the center of the electronic component 12, as indicated in FIG. 3. In this case, a length (b) of the perpendicular illumination device 15 is set to be not smaller than half the size (a) of the view field, i.e., b≧(a/2) is held. A length of the illumination device 14 is determined by the illumination angle $\phi_1$. LEDs of the illumination device 14 are arranged with high density on a plane within a distance $L_1$ to a component recognition position. Because of this arrangement of the illumination devices, the light can be condensed efficiently both in the longitudinal direction (s) of the image-acquiring line and in the lateral direction (p) of the image-acquiring line. Meanwhile, if the utilized illumination device is a light source of a high directivity as in the embodiment, an illuminance irregularity is easy to generate in the acquiring line of the line sensor. Particularly when illumination heights $L_1$, $L_2$ of the illumination devices are lowered in FIG. 2 to further increase concentrating character and the illuminance of the concentrated light, the illuminance irregularity is apt to be generated in the longitudinal direction of the image-acquiring line. For counteracting this inconvenience, the illumination heights $L_1$, $L_2$ of the perpendicular illumination devices to the scanning direction of the electronic component are determined to satisfy the following equations:

$$\tan \phi_1 = L_1/(b+a/2)$$

$$\tan \phi_2 = L_2/(a/2)$$

$$\therefore L_1 = (b+a/2)^* \tan \phi_1 \quad (1)$$

$$\therefore L_2 = (a/2)^* \tan \phi_2 \quad (2)$$

wherein $\phi_1$, $\phi_2$ are illumination angles of the illumination devices 14, 15 respectively. With the illumination heights $L_1$, $L_2$ being determined as above, the illumination devices 14, 15 in the direction perpendicular to the scanning direction of the electronic component can uniformly illuminate the longitudinal view field (s) symmetric right and left to the center position of the electronic component 12. In other words, when the illumination heights $L_1$, $L_2$ of the illumination devices 14, 15 in the direction to the scanning direction of the electronic component are determined according to the equations (1), (2) after the longitudinal illumination size (s) is set to satisfy s≧a, the illuminance irregularity in the longitudinal direction of the image-acquiring line can be avoided. Moreover, if the arrangement radius (r) of the illumination devices 16–20 in the vertical direction to the scanning direction of the electronic component is determined in conformity with the illumination height $L_2$ of the illumination device 15 in the direction perpendicular to the scanning direction of the electronic component, the illuminance irregularity can be prevented without losing the condensing efficiency of light in the lateral direction (p) of the image-acquiring line. Although many LEDs are disposed on a plane to obtain the illumination device of a high directivity according to the embodiment, needless to say, a surface illuminant rather than the LEDs can be used in the present invention. In addition, although the five illumination devices illuminating with the angles $\phi_3$–$\phi_7$ are utilized, a count of the illumination devices is not specifically limited so long as the illumination devices are arranged on a circumference. If the wavelength of each light source is rendered variable, it becomes possible to employ a light source of the optimum wavelength for each of electronic components of different reflectances. FIG. 5 indicates an example when the illumination angle is made variable. Leads of LEDs 41 as the illumination devices mounted on the mounting board 42 are bent uniformly with an angle φ. It is naturally possible to adjust the illumination angle by arranging the mounting board while inclining the mounting board itself at an angle to an object to be image-acquired and then bending the leads of LEDs, which can be carried out at low cost. In the meantime, FIG. 6 shows an example wherein four illumination devices 30 are added at the uppermost part of the image acquiring device. An illumination luminance to the acquiring line can be changed by turning the illumination devices 30 on and off in accordance with a shape of the electronic component to be recognized. For instance, in order to recognize all balls of an electronic component in a package such as a BGA (ball grid array) or the like, e.g., in order to illuminate spherical ball portions from all directions as much as possible to thereby image-acquire the ball portions in the shape of a circle or doughnut which is required for the subsequent recognition process, the illumination devices 30 are effective. It is similarly effective to vary the illuminances and wavelengths of the illumination devices 30 in accordance with the reflectances of the electronic components.

As is made clear from the above description of the present invention, each light source is adapted to condense light to the image-acquiring line of the line sensor to eliminate the issue of the insufficient illuminance caused when the electronic component is image-acquired at high speed by the line sensor. Accordingly, not only the light is condensed highly efficiently and the illuminance irregularity can be limited to a minimum, but the deficiency of sensitivity resulting from insufficient charging of the line sensor can be eliminated. The image acquiring device for a component mounting apparatus which is capable of image-acquiring at high speed can be hence realized at low cost.

The entire disclosure of Japanese Patent Application No. 8-108220 filed on Apr. 26, 1996, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image acquiring device for use with an electronic component and a component mounting apparatus operable to move the electronic component along a component-moving path, said image acquiring device comprising:

a line sensor including photodetecting elements in at least one array forming an image-acquiring line oriented to have a view across the component-moving path, an output part, and a charge coupled device register for transmitting electric charges accumulated in said photodetecting elements to said output part;

a first plurality of light sources of a high directivity oriented so as to illuminate light in directions which are perpendicular to the component-moving path so as to directly illuminate the electronic component and condense the light onto said image-acquiring line of said line sensor; and a second plurality of light sources of a high directivity oriented so as to illuminate light in directions which are perpendicular to the directions of the light of the first plurality of light sources as viewed through the component-moving path and which intersect the component-moving path so as to directly illuminate the electronic component and condense the light onto said image-acquiring line of said line sensor.

2. An image acquiring device as claimed in claim 1, wherein each of said first plurality of light sources is operable to illuminate the electronic component at a respective angle and each of said plurality of second light sources is located on a circumference of a circle having a predetermined radius such that said each of said plurality of second light sources is operable to illuminate the electronic component at a respective angle.

3. An image acquiring device as claimed in claim 2, wherein said first plurality of light sources are disposed at an illumination height determined based on an illumination angle and an illumination size in a longitudinal direction of said image-acquiring line of said line sensor.

4. An image acquiring device as claimed in claim 3, wherein the predetermined radius is based on the illumination height of the first plurality of light sources.

5. An image acquiring device as claimed in claim 2, wherein said first and second plurality of light sources have a variable luminance.

6. An image acquiring device as claimed in claim 2, wherein said first and second plurality of light sources have a variable illumination angle.

7. An image acquiring device as claimed in claim 2, wherein said first and second plurality of light sources have a variable wavelength.

8. An image acquiring device as claimed in claim 2, further comprising a plurality of illumination devices wherein each of said first plurality of light sources is located on one of said illumination devices and each of said illumination devices is disposed at one of a first illumination height L1 and a second illumination height L2 which are determined according to the following equations:

$$L1 = (b + a/2) * \tan \phi 1$$

$$L2 = (a/2) * \tan \phi 2$$

wherein $\phi_1$ and $\phi_2$ are illumination angles of said light sources on said each illumination device, a is a longitudinal length of said image-acquiring line, and b is a length of the illumination devices which is smaller than half the longitudinal length a, so that the illumination devices are operable to uniformly illuminate a filed of view of the line sensor within which the electronic component is to be viewed.

9. An image acquiring device as claimed in claim 1, wherein said first and second plurality of light sources have a variable luminance.

10. An image acquiring device as claimed in claim 1, wherein said first and second plurality of light sources have a variable illumination angle.

11. An image acquiring device as claimed in claim 1, wherein said first and second plurality of light sources have a variable wavelength.

12. An image acquiring device as claimed in claim 1, wherein said first and second plurality of light sources comprise light emitting diodes.

* * * * *